(12) United States Patent
Lim

(10) Patent No.: US 6,179,638 B1
(45) Date of Patent: Jan. 30, 2001

(54) CONNECTOR FOR USE IN A CARD READER

(75) Inventor: Bong-Soon Lim, Kwangmyung-Si (KR)

(73) Assignee: Hyosung Electronics Co., Ltd (KR)

( * ) Notice: Under 35 U.S.C. 154(b), the term of this patent shall be extended for 0 days.

(21) Appl. No.: 09/327,431

(22) Filed: Jun. 7, 1999

(30) Foreign Application Priority Data

Jun. 9, 1998 (KR) ................................. 98-009786
May 6, 1999 (KR) ................................. 99-016204

(51) Int. Cl.[7] ................................................. H01R 13/15
(52) U.S. Cl. ............................... 439/260; 439/262
(58) Field of Search ................................ 439/260, 261, 439/262, 263, 64, 188

(56) References Cited

U.S. PATENT DOCUMENTS

| 1,001,035 | 8/1911 | Hubert . | |
|---|---|---|---|
| 4,006,336 | 2/1977 | Boyden | 200/246 |
| 4,501,465 | 2/1985 | Hoshino et al. | 339/176 |
| 4,747,790 | 5/1988 | Masuda et al. | 439/631 |
| 4,900,272 | 2/1990 | Lange et al. | 439/630 |
| 4,900,273 | 2/1990 | Lange et al. | 439/630 |
| 5,012,078 | * 4/1991 | Pernet | 439/260 |
| 5,013,255 | 5/1991 | Juret et al. | 439/260 |
| 5,091,618 | * 2/1992 | Takahashi | 439/261 |
| 5,667,408 | * 9/1997 | Broschard, III et al. | 439/260 |

FOREIGN PATENT DOCUMENTS

| 85 29 580 U | 10/1985 | (DE) | G06K/7/04 |
|---|---|---|---|
| 131410 | 1/1985 | (EP) | G11C/5/00 |
| 231409 | 8/1987 | (EP) | G06K/7/06 |
| 2578072 | 8/1986 | (FR) . | |
| 231409 | 8/1987 | (FR) | 7/6 |
| 665381 | 1/1952 | (GB) | 38/1 |
| 2124420 | 2/1984 | (GB) | 13/8 |
| 60-173789 | 7/1985 | (JP) . | |

\* cited by examiner

Primary Examiner—T. C. Patel
(74) Attorney, Agent, or Firm—Daniel McCarthy; Jaiwook Lee

(57) ABSTRACT

A connector for use in a card reader is provided. A frame is included for accommodating a card therein. The frame has an opening through which a card is inserted into the frame and removed from the frame. A plurality of connector terminals are mounted on the frame, being insulated from one another and each of the connector terminal extending from the frame to contact the card. A card sensor switch is provided for detecting complete insertion of the memory card in the frame. The card sensor switch is mounted in the inner rear portion of the frame, in an electrically insulated insulation state. A landing yoke supporting one portion of each of the connector terminals is pivotably mounted to the frame in order to minimize the sliding contact area of the memory card with the connector terminals during insertion or removal of the memory card.

9 Claims, 5 Drawing Sheets

CONNECTOR FOR USE IN A CARD READER

Priority is hereby claims to Korean Patent Application Ser. No. 20-1998-0009786 filed on Jun. 9, 1998.

BACKGROUND

1. The Field of the Invention

The present invention relates to a connector for use in a memory card reader and, more particularly, to a novel connector for memory card readers that will increase operative reliability and endurance by ensuring an exact electrical contact between the memory card and the connector.

2. The Background Art

In recent years, many different kinds of cards have become more popular and have been widely used. Credit cards, bank cards, identification cards and many other cards are used in our increasingly complicated and rapidly changed society. More recently, a memory card or a smart card having an integrated circuit (IC) memory chip has been developed with increased capability of storing data, which can hold much more information than a magnetic strip type card. Use of the memory cards is rapidly increasing in the banking industry and for the purpose of storing personal data, such as electronic identification cards, driver's licenses, social security cards, financial cards and others.

Accordingly, a memory card reader which can read the data stored on a memory card has also been developed. To access the information stored on the memory card, the card reader should be equipped with a connector making an electrical connection with the contact elements of the semiconductor device, e.g. the IC chip. The present invention is related to a novel means of ensuring good connection with the memory card contact elements.

Typically, terminals of the memory card reader and the contacting elements touch each other to provide electrical connection between the terminals and the contacting elements. To provide good connection between the terminals of the memory card reader and the contacting elements of the memory card, a narrow slot of the memory card reader for inserting a card has been designed to hold the memory card tightly in a proper position. Moreover, the memory card must be pressed against the terminals of the memory card reader to reduce change of resistance at the terminals. However, the contact surface area between the memory card and the card reader should be minimized for smooth insertion and removal of the memory card. Less contact surface can provide operative reliability and durability for the card and for the memory card reader. In addition, malfunctioning by static electricity caused by sliding contact between parts can be reduced.

A number of attempts have been made in the prior art to accomplish an effective memory card reader. One attempt to solve the problems of prior art is disclosed in U.S. Pat. No. 4,900,272 (which is hereby incorporated by reference) which presses the memory card against the terminals of memory card reader in an attempt to ensure consistent contact with the contact elements of memory card.

However, the prior art has some disadvantages which are generally recognized in the industry. Even though in the prior art the memory card is held in pressed contact with the reader, the contacting force is no more than the bending force generated by the terminals. Moreover, terminals can easily be bent from a sudden insertion of card or any other strong force, resulting in a short circuit in the card reader. When a terminal is bent and touches an adjacent terminal, the card reader no longer functions properly. Furthermore, because of the pressure against the terminals, strong force has to be applied to insert or remove the memory card. Consequently, prior art devices have low durability and a short useful life. While attempts have been made in the prior art to increase the durability and efficiency of these components, those attempts were not successful until the time of the present invention.

BRIEF SUMMARY AND OBJECTS OF THE INVENTION

In view of foregoing, it is a primary object of the present invention to provide a connector for use in a card reader, which is capable of increased operative reliability and endurance, and at the same time, ensuring an exact electrical contact between the memory card and the card reader.

It is also an object of the present invention to provide a connector for use in a card reader, which is capable of having a card smoothly inserted into it and removed from it.

Consistent with the foregoing objects, and in accordance with the invention as embodied broadly described herein, a connector for use in a card reader is disclosed in one embodiment of the present invention, comprising: a frame for accommodating the card therein, the frame having an opening through which the card may be inserted into the frame and removed from the frame; a plurality of connector terminals mounted on the frame, being insulated from one another and each of the connector terminal being extended from the frame to be contacted with each of the card contact element; a card sensor switch for detecting a complete insertion of the memory card is mounted in an inner rear portion of the frame, maintaining an insulation state; and a landing yoke supporting one portion of each of the connector terminals and being pivotly mounted in the frame to minimize sliding contact area of the memory card with the connector terminals during insertion or removal of the memory card.

The foregoing and other objects and features of the present invention will become more fully apparent from the following description and appended claims, taken in conjunction with the accompanying drawings.

BRIEF DESCRIPTION OF THE DRAWINGS

Understanding that these drawings depict only typical embodiments of the invention and are, therefore, not to be considered limiting of its scope, the invention will be described with additional specificity and detail through use of the accompanying drawings in which.

DETAILED DESCRIPTION OF THE PREFERRED EMBODIMENTS

It will be readily understood that the components and steps of the present invention, as generally described and illustrated in the Figures herein and accompanying text, could be arranged and designed in a wide variety of different configurations while still utilizing the inventive concept. Thus, the following more detailed description of the preferred embodiments of the system and method of the present invention, as represented in FIGS. 1 through 10 and accompanying text, is not intended to limit the scope of the invention, as claimed, but it is merely representative of the presently preferred embodiments of the invention. The presently preferred embodiments of the invention will be best understood by reference to the drawings, wherein like parts or steps are designated by like numerals throughout.

Figure 1:
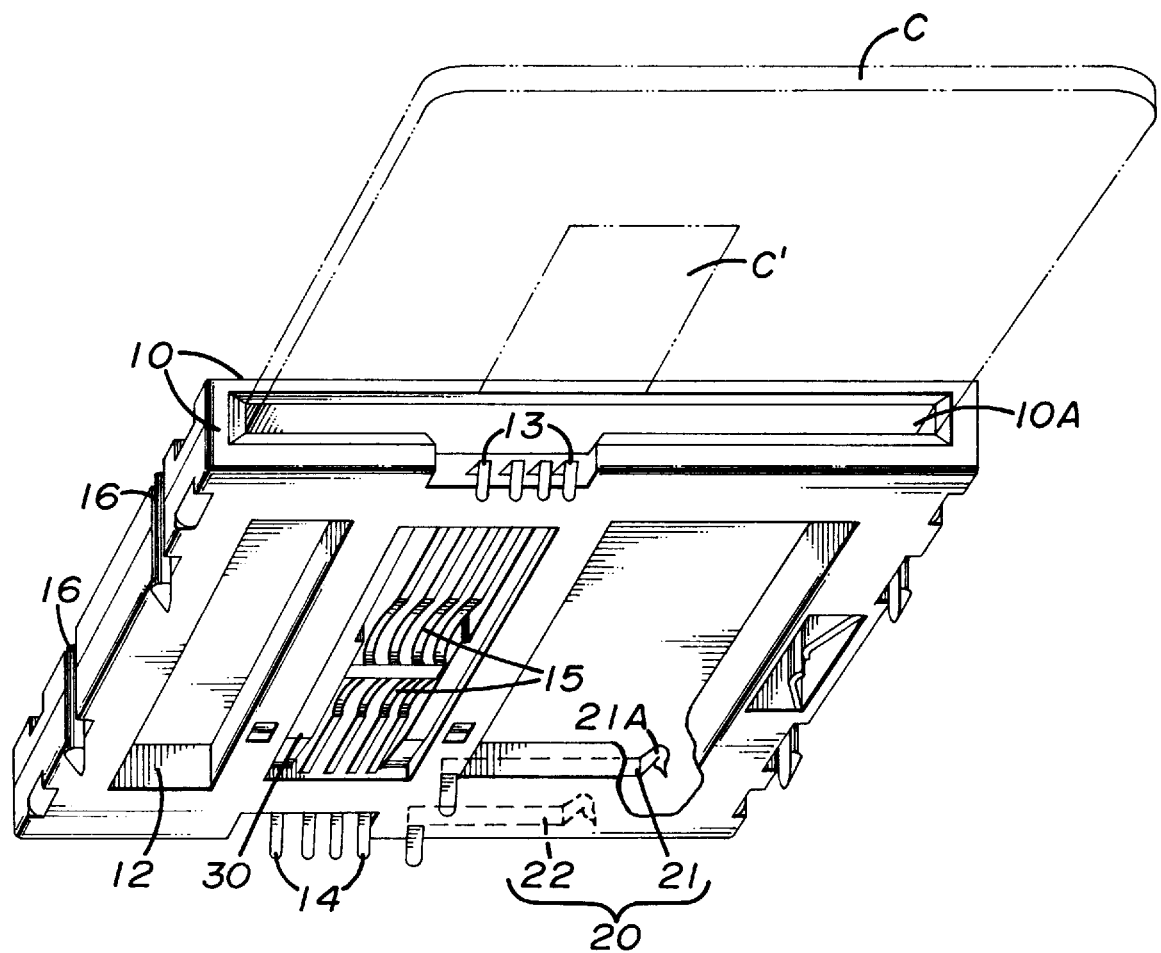
FIG. 1 is a perspective view of the present invention, showing the connector assembled in a preferred embodiment.

Referring to FIG. 1, the connector for use in a card reader reads information stored in a memory chip of the memory card (C) by making electrical contacts between the terminals (13 and 14) of the card reader and contacting elements (C') of the memory card.

The memory card (C) can be inserted into a frame (10) and removed from the frame (10) through an opening (10a). The frame (10) constitutes the inventive connector. The frame (10) is preferably divided into at least two portions in such a manner that each of the portions is made of plastic by an injection molding and then is assembled into a united member. However, other generally known manufacturing method can also be used to achieve the objects of the present invention.

The opening (10a) and other elements of the frame (10) define the inner space for the memory card (C) to properly hold the memory card in a desired position and to be properly inserted into the card reader and removed from the card reader without much of friction.

Still referring to FIG. 1, a plurality of a connector terminals (13 and 14) are capable of making an electrical connection with the card contacting element (C'). The terminals (13 and 14) are mounted on the frame (10) and extend from the frame (10) outwardly. Each terminal is electrically insulated from the others by the frame (10) and other elements of the present invention. The connector terminals (13 and 14) are preferably made of alloy containing copper and preferably have a connection resistance of 100 mΩ or less.

Curved portions (15) of the terminals (13 and 14) are smoothly curved at the end portion of the connector terminals (13 and 14) in order to be contactable with the card contacting elements (C') of the memory card (C), at a predetermined heights. The connector terminals (13 and 14) are preferably a unitary piece of metal through the curved portion through the terminal (13 and 14) ends.

Figure 2:
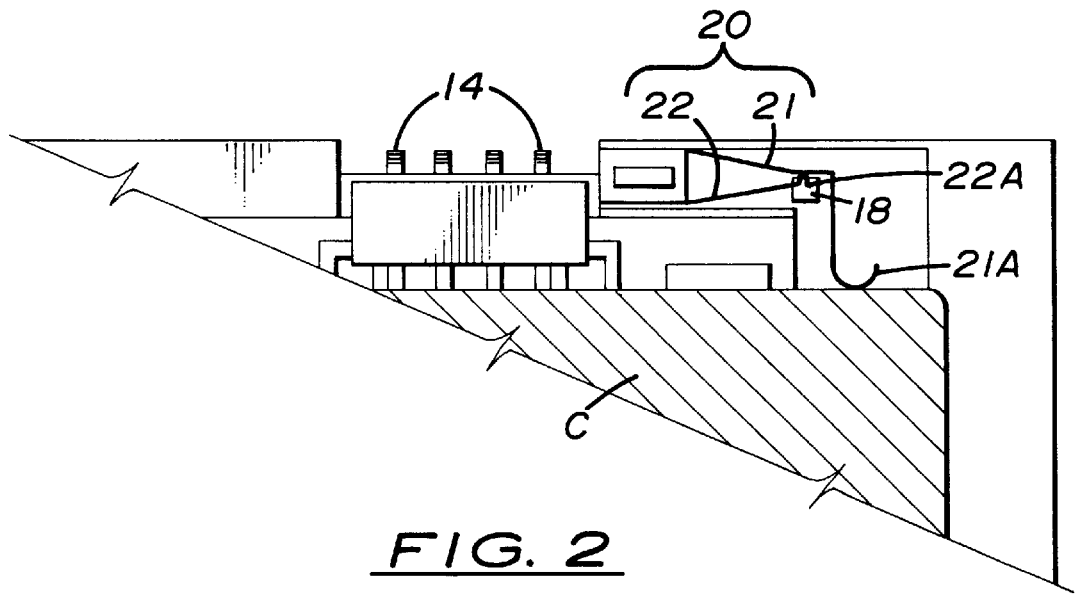
FIG. 2 is a sectional view of a preferred embodiment of the present invention, showing a memory card being inserted but a card sensor switch not being activated yet.
Figure 3:
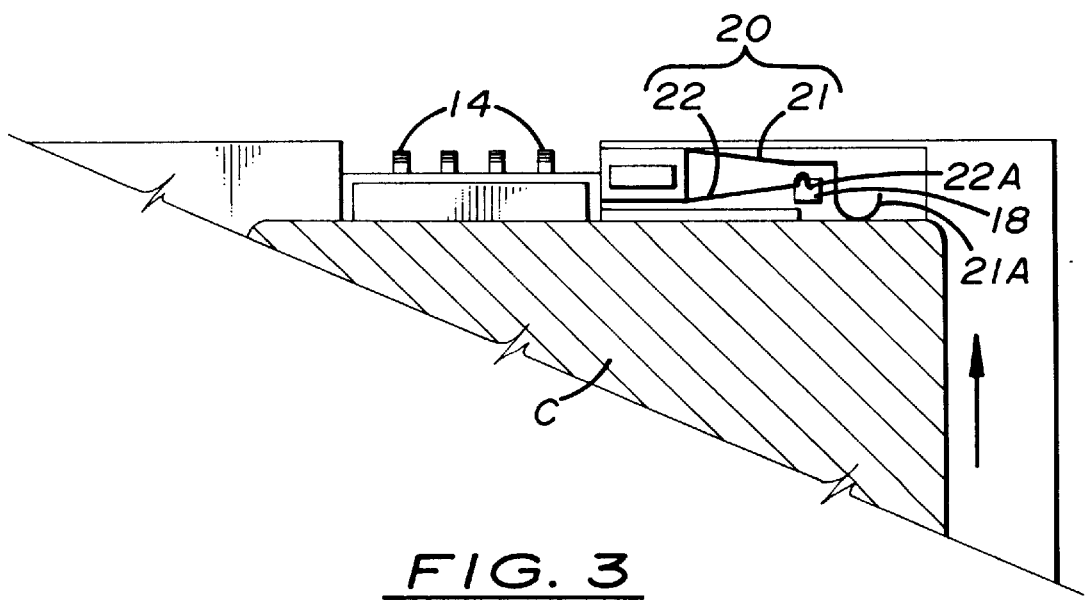
FIG. 3 is another sectional view of a preferred embodiment of the present invention, showing a memory card being fully inserted and a card sensor switch being activated.

Now referring to FIG. 2 and FIG. 3, a preferred embodiment of a card sensor switch (20) is depicted with a memory card (C) fully inserted. FIG. 2 depicts the status of the card sensor switch (20) in an inactivate state when the memory card (C) is being inserted into the card reader but is not yet fully inserted.

In a preferred embodiment of the present invention, the card sensor switch (20) for detecting a complete insertion of the memory card (C) is preferably mounted in rear inner portion of the frame (10), insulated from other structures of the device.

The card sensor switch (20) comprises a movable member (21) and a fixed member (22). Both ends of the movable member (21) and the fixed member (22) are preferably fixed in the frame (10), and connection points for both members are extended to the outside of the frame (10) for mounting on a printed circuit board.

The movable member (21) is elastically deformable to be disconnected from the fixed member (22), when its lead (21a) comes into a contact with the memory card (C). The lead (21a) extends into the inner space of the frame (10), and has a J-shaped configuration in order to avoid a damage of the memory card (C). The fixed member (22) has a U-shaped portion at its free end on which a mid portion of the movable member (21) is elastically contacted. The card sensor switch (20) preferably exerts an elastic force which is enough to maintain a predetermined level of force to assure engagement and disengagement of the movable member (21) from the fixed member (22) to generate a clear on or off signal for a card sensing circuit.

When the memory card (C) is inserted into the frame (10) and reaches the rear wall of the frame (10), the lead (21a) of the movable member (21) is depressed by the memory card (C) so that it moves rearwardly. As the movable member (21) moves further toward the rear wall of the frame (10), the fixed member (22) is also slightly moved in the same direction. However, an extension (22a) of the fixed member (22) is preferably bent downwardly to be engaged in a hole (18). The hole (18) limits the moving distance of the fixed member (22). Therefore, the movable member (21) can be disengaged from the fixed member (22) as the memory card (C) pushes the moveable member (21) further back.

When the electrical state of the card sensor switch (20) is changed and informs of the completion of the insertion of the memory card (C) through an electrical circuit, a controller (not shown) of the card reader preferably starts a predetermined algorithm to read the information from the memory card (C).

When the memory card (C) is removed from the frame (10), the movable member (21) is elastically restored from its stressed position to a rest position. When the memory card (C) is disengaged from the movable member (21), the fixed member (22) of card sensor switch (20) is also elastically restored to its original position, and the movable member (21) and the fixed member (22) come into contact again, allowing the controller of the card reader to be in a stand-by state.

Figure 4:
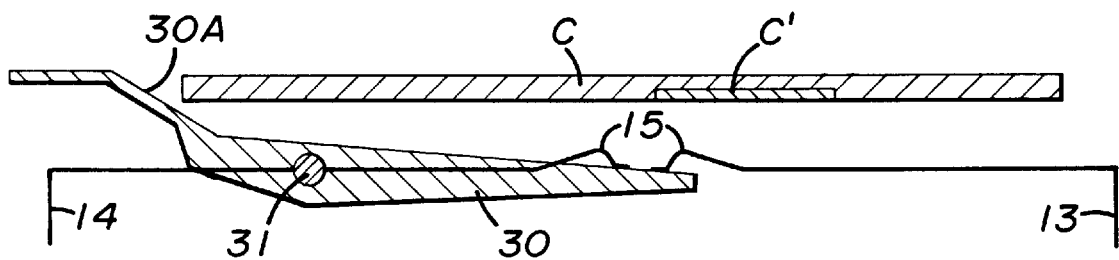
FIGS. 4 and 5 offer schematic sectional views of a landing yoke in an initial state of the memory card insertion and a completion state of the memory card insertion, respectively.

Now returning to FIG. 1 and referring to FIG. 3 and FIG. 4, a landing yoke (30) supporting one set of the connector terminals (13 and 14) is pivotably mounted with the frame (10) to minimize sliding contact area of the memory card (C) with the frame (10) during an insertion or removal of the memory card (C). The landing yoke (30) has a plurality of slots for the set of connector terminals (13 and 14) spaced apart from one another and is preferably made of injection molded plastic. Therefore, each contacting terminal of the set of the connector terminals (13 and 14) is electrically insulated from the adjacent terminals by the landing yoke (30).

Figure 5:
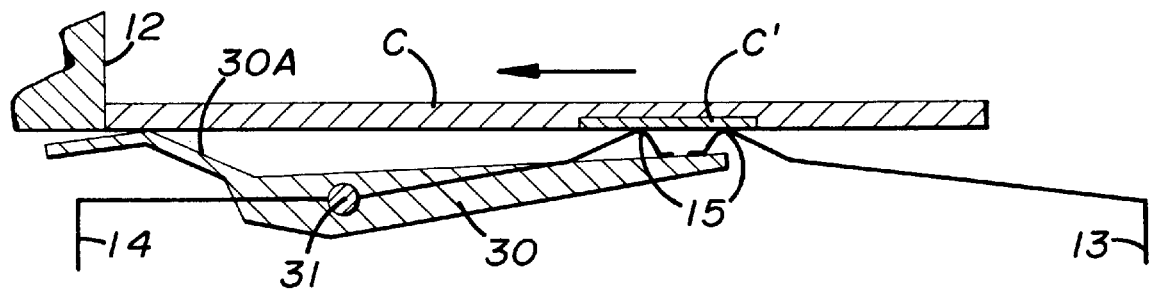

FIGS. 4 and 5 show preferable schematic sectional views of the landing yoke in an initial state of the memory card (C) insertion and a completion state of the memory card insertion, respectively.

The landing yoke (30) is preferably engaged within a predetermined angular range about a hinge (31). As the memory card (C) is fully inserted, a slanted abutment (30a) is preferably pushed downward and the other end of the landing yoke (30) is raised upwardly. Accordingly, the contact points of the connector terminals (13 and 14) are also preferably raised to make good contact with the contacting elements (C') of the memory card (C).

The slanted abutment (30a) of the rear portion of the landing yoke (30) extends beyond a rear wall (12) of the frame (10). The rear wall (12) is preferably designed to allow upward and downward movement of the landing yoke (30).

In this preferred embodiment, the rear wall (12) is preferably split on both sides to allow the upward and downward movement of the landing yoke (30) therebetween. The end portions of the connector terminals (13 and 14) forwardly extending from the curved portion (15) are preferably designed to be engaged on the landing yoke (30), so that the connector terminals (13 and 14) cannot be easily deviated from the landing yoke (30).

When the memory card (C) is inserted in the card reader and reaches almost the rear wall of the frame (10) as shown in FIG. 4, the card contact elements (C') are not yet in contact with the connector terminals (13 and 14). As the memory card (C) is pushed more toward the rear wall (12), the memory card (C) comes in contact with the slanted abutment (30a) of the landing yoke (30). Then, the slanted abutment (30a) is pushed downward, rotating the landing yoke (30) with respect to the hinge (31). Consequently, the curved portions (15) of the connector terminals (13 and 14) are preferably raised and elastically forced to make good electrical connection with the contacting elements (C') of the memory card (C).

When the raised curved portion (15) comes in contact with the card contact elements (C'), the connecting operation is complete. The controller of the card reader can then access the data stored in the memory card (C) through the card contact elements (C'). When the memory card (C) is removed from the frame (10), the slanted abutment (30a) of the landing yoke (30) is raised to its original position, and the other end of the landing yoke (30) is lowered. Consequently, the curved portion (15) is elastically restored and the connector terminals (13 and 14) are also elastically restored to their original positions.

As explained above, the card contacting elements (C') are preferably not in contact with any other elements of the frame (10) except the contact terminals (13 and 14), avoiding any unnecessary friction, resistance, scratch, or rubbing. Therefore, the card contact elements (C') are preferably protected from wear and tear, and can last longer by the present invention than any other card reader known to those skilled in the art.

In accordance with the present invention, the operation of the card sensor switch (20) and the operation of connecting the terminals (13 and 14) to the contacting elements (C') may occur almost at the same time during the memory card insertion. However, either operation may be electrically detected by the card reader system.

Figure 6:
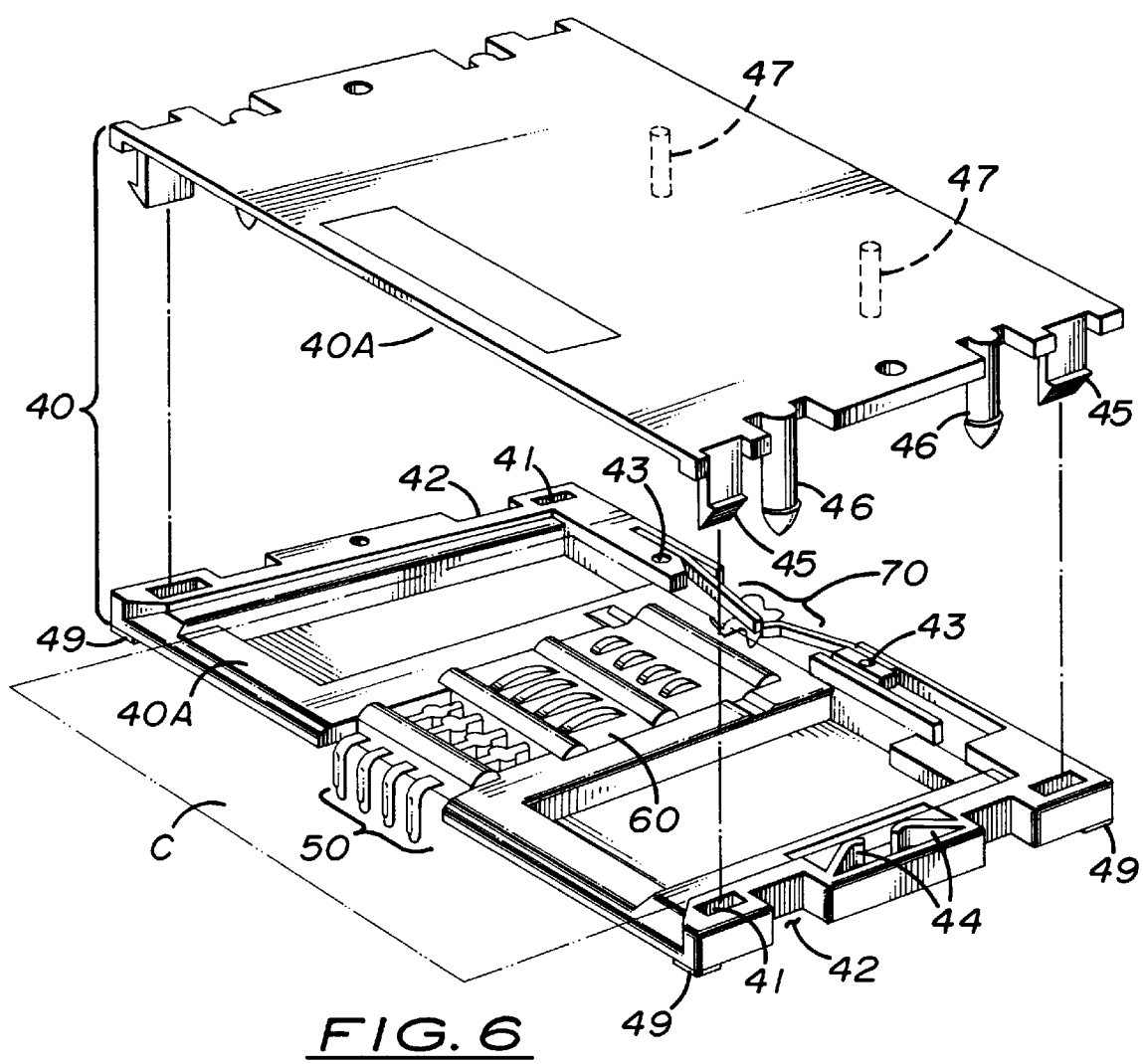
FIG. 6 is a perspective view of a preferred embodiment of the present invention, also showing another preferred embodiment of the card sensor switch of the present invention.

Now referring to FIG. 6, the drawing depicts the second preferable embodiment of the present invention which includes another preferred embodiment other than the disclosed preferred embodiment above.

A configuration of a frame (40) is similar to the frame (10) shown in FIGS. 1 through 5. Functionally, the frame (40) also accommodates the memory card (C) which is insertable thereinto or removable therefrom through the opening (40a).

A pair of posts (47) is preferably formed on an upper member of the frame (4) and a pair of receiving holes (43) as counterpart to the posts (47) are formed to firmly combine the upper member and the lower member of the frame (40).

Each of the posts (47) preferably extends beyond the lower member of the frame (40) in length through the receiving hole (43) when the upper member and the lower member of the frame (40) are assembled together. When the upper member and the lower member are assembled into the frame (40), portions of the posts (47) extending beyond the receiving holes (43) are preferably melted down to have a diameter larger than the diameter of the receiving hole (43), allowing the upper member and the lower member of the frame (40) tightly assembled together. This configuration can prevent a middle portion of the frame (40) from being separated from each other, increasing reliability of the connection between the memory card (C) and the frame (40).

In order to minimize unwanted movement of the memory card (C) in the frame (40) and also to make sure positioning of the memory card (C) is consistent, a pair of push plates (44) for nudging the memory card (C) in one direction are preferably formed in the frame (40) as shown in FIG. 6. Each of the push plates (44) is preferably facing another. The push plates (44) are curved or angled at their ends to reduce friction with the memory card (C).

The push plate (44) is integrally molded with the frame (40). It is also possible to have the push plates on both sides of the frame (40). However, the preferred embodiment of the present invention shows one push plates (44) to achieve the objects of the present invention.

An optimal clearance or a gap between the memory card (C) and the frame (40) may be necessary although the push plate (44) exerts a nudging force on the memory card (C).

Figure 7:
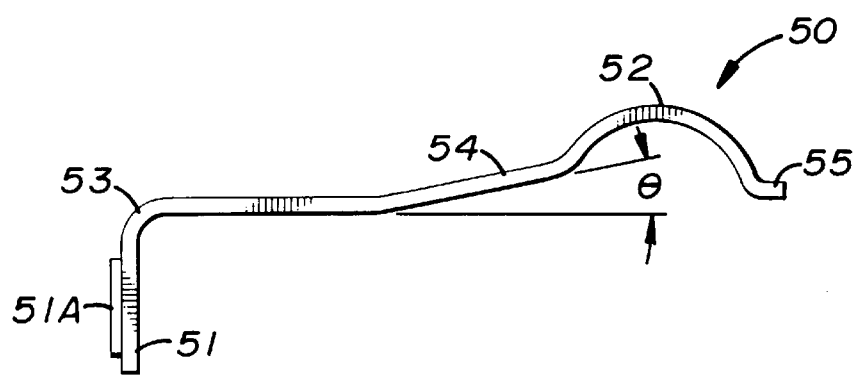
FIG. 7 is a side view of a connector terminal in accordance with the preferred embodiment of the present invention.

FIG. 7 depicts a connector terminal (50) in accordance with another embodiment of the present invention.

As shown in FIGS. 6 and 7, a plurality of a connector terminals (50) to provide electrical connection with the card contact elements (C') are preferably mounted on the frame (40) as described in the first preferred embodiment of the present invention. The connector terminals (50) also extend out of the frame (40) as shown in the FIG. 6, and are also electrically insulated by the frame (40). The connector terminals (50) have forwardly extending portions and rearwardly extending portions which are similar to those of the connector terminals (13 and 14) shown in FIG. 1. Similarly, installation of the connector terminals (50) on the frame (40) and the electrical connection between the connector terminals (50) and the card terminals (C') of the memory card (C) are identical to those of the connector terminals (13 and 14) as described in the section associated with FIG. 1.

As shown in FIG. 7, each of the connector terminals (50) is provided with an external end (51), a bent portion (53), an inclined portion (54), a curved portion (52) and an inner end (55) which are integrally formed with one another. The external end (51) is preferably extended from the inclined portion (54) through the bent portion (53). The inclined portion (54) is slightly bent with a predetermined slant angle θ with the horizontal line as shown in FIG. 7. The curved portion (52) preferably has a convex configuration for a contact with the contact elements (C') of the memory card (C). The inner end (55) is bent at the end of the curved portion (52).

The connector terminal (50) can be preferably made by a press working. However, other methods of making the connector terminal (50) known to those skilled in the art are also feasible. It has been found that when the slant angle θ is approximately 7.5°, the elastic force exerted on the memory card (C) by the curved portion (52) can be maximized. However, the angle can be changed depending on other factors, such as, the total length of the connector terminal (50), materials used, the shape of the curved portion (52), and others. It has been also found that when a radius of the bent portion (53) is about 1 mm, occurrence of the crack is minimized and intensity of the bent portion (53) is maximized. This also can be varied depending on other factors, such as the angle of the slanted portion (54), material used, the total length or size of the connector terminal (50) and others.

Firmly engaged with the external end (51) of the connector terminal (50) is a bead (51a) evenly protruding along the external end (51) to reinforce the external end (51). The bead (51a) can reinforce the external end (51), and also prevents solder from flowing down along the external end (51).

It is preferable that the external end (51) be plated with tin-lead (SnPb) in a thickness of 4 μm, the bent portion (53) be plated with nickel (Ni) in a thickness of 4 μm, and the curved portion (52) be plated with gold (Au) in a thickness of 1.2 μm. However, other thicknesses for each element are possible depending on the application of the present invention.

Figure 8:
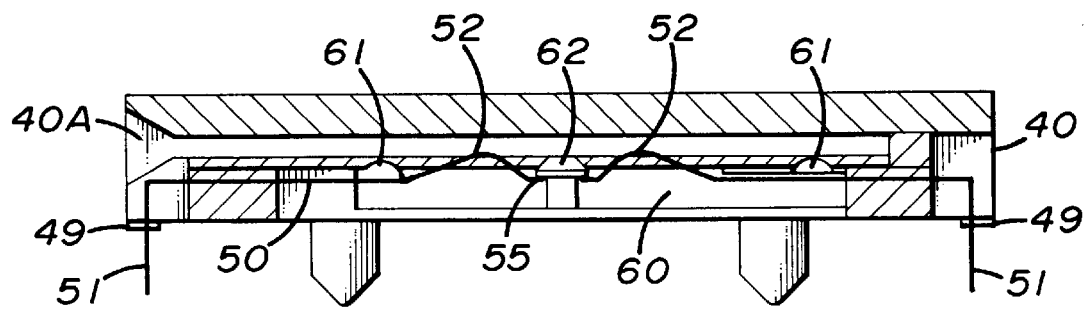
FIG. 8 is a sectional view of the preferred embodiment of the present inventions depicting structure of a lever and terminals.

FIG. 8 represents a sectional view of a lever in accordance with the second embodiment of the present invention.

As shown in FIGS. 6 through 8, in the preferred embodiment of the present invention, the lever (60) supporting one portion of the connector terminals (50) is detachably mounted on the frame (40). The lever (60) can guide the curved portion (52) to help ensure an even contact thereof to the memory card (C).

As with the landing yoke (30) as shown in FIG. 1, the lever (60) electrically insulates the connector terminals (50) from each other. However, the lever (60) is detachably fixed on the frame (40), unlike the landing yoke (30) which can be rotated when the memory card (C) is inserted into the frame (10).

The lever (60) includes frontal and rear beads (61) for limiting upward deformation of the inclined portion (54) of the connector terminals (50). A center bead (62) is provided for limiting an upward deformation of the inner end (55). When the lever (60) is installed on the frame (40) preferably by press-fitting, the inclined portions (54) are pressed by the frontal and the rear beads (51) and the inner ends (55) are pressed by the center bead (62), with the curved portion (52) protruding upwardly.

The beads (61 and 62) have heights substantially identical to each other and smaller than that of the curved portion (52) of the connector terminals (50). In this configuration, the lever (60) preferably comes into contact with the memory card (C) only at the frontal and the rear beads (61) and the center bead (62) rather than an entire surface of the lever (60). Therefore, the friction between the memory card (C) and the lever (60) is significantly reduced and this also reduces the possibility of malfunction due to the static electricity.

In operation, when the memory card (C) is inserted into the frame (40) and arrives at the connector terminals (50) through the frontal bead (61), the connector terminals (50) are deflected slightly downward. As the memory card (C) is further pushed in the frame (10), the curved portions (52) come into a contact with the memory card (C).

Reading the data from the memory card (C) is accomplished in a manner similar to that of the embodiment of the present invention as shown in FIGS. 4 and 5.

When the memory card (C) is removed from the frame (40), each of the connector terminals (50) starts to be elastically restored until it is limited by the frontal and the rear beads (61) and the center bead (62). As a result, the heights of the curved portions (52) can be kept substantially identical to one another.

Figure 9:
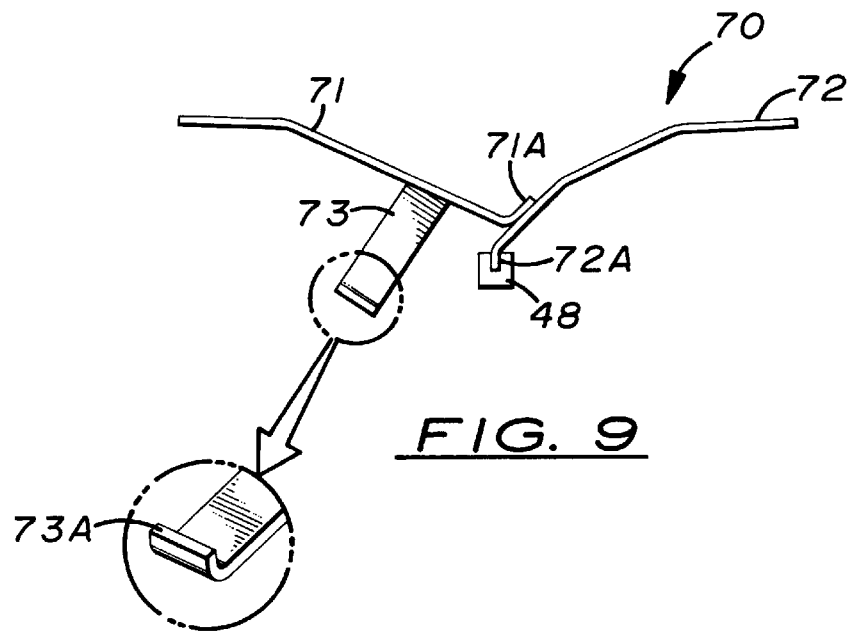
FIG. 9 is a perspective view of a card sensor switch in accordance with the preferred embodiment of the present invention.

FIG. 9 depicts another preferred embodiment of a card sensor switch (70) of the present invention.

As shown in FIGS. 6 through 9, the card sensor switch (70) for detecting a complete insertion of the memory card (C) is preferably mounted in an inner rear portion of the frame (40), maintaining an insulation state from other components. As like the card sensor switch (20) described in FIGS. 2 and 3, the card sensor switch (70) is provided with a movable member (71) and a fixed member (72).

The movable member (71) is elastically deformed, when its contact extension (73) comes into contact with the memory card (C). It is preferable that the movable member (71) and the contact extension (73) be made in a bending manner as shown in FIG. 9. An end (71a) of the movable member (71) and an end (72a) of the fixed member (72) are bent to have a U-shaped configuration. Likewise, the end (73a) of the contact extension (73) is bent to have an L-shaped configuration which can preferably be pushed by the memory card (C) when fully being inserted.

Similar to the fixed member (22) shown in FIGS. 2 and 3, the end (72a) of the fixed member (72) is preferably bent downwardly and is engaged within a groove (48) formed on the frame (40). The movement of the fixed member (72) is limited to a predetermined range. Therefore, when the memory card (C) is inserted into the frame (40), the movable member (71) and the fixed member (72) start to be concurrently and elastically deformed and then the fixed member (72) is stopped at a predetermined position, whereas the movable member (71) continues to be deformed. Accordingly, the movable member (71) is disconnected from the fixed member (72).

On the other hand, as shown in FIGS. 6 through 8, a number of base feet (49) are formed on a lower surface of the frame (40) to keep the frame (40) spaced apart from a circuit board by a predetermined distance, avoiding any irregular surface of the printed circuit board and also preventing transformation of the frame (40). It is preferable that the height of the base feet (49) be about 0.3 mm. The base feet (49) are preferably positioned in such a manner that they are equally spaced.

Figure 10:
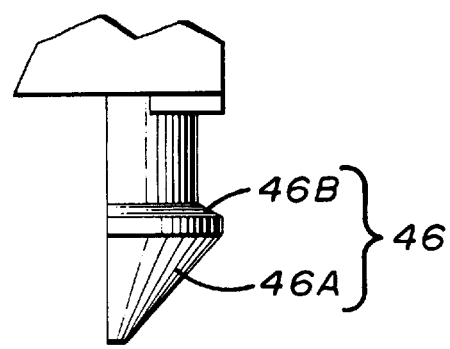
FIG. 10 is an enlarged view of a hook of the connector in accordance with the preferred embodiment of the present invention.

Referring to FIG. 10, a hook (46) of the upper member of the frame (10) is shown in accordance with the second embodiment of the present invention.

As shown in FIGS. 6 through 10, the frame (40) having an upper member and a lower member has a plurality of hooks (46) for firmly securing the upper member to the lower member. Each of the hooks (46) has two slanted or angled surfaces (46a) and (46b) adjacent to each other. The lower slanted surface (46a) can guide the insertion of the hook (46). The upper slanted surface (46b) can sustain the inserted hook (46) in a proper position, holding the assembled frame of the upper member and the lower member tightly together.

The inventive connector for use in a card reader for reading data from a memory card constructed in this manner can increase an operative reliability and endurance by ensuring an exact electrical contact between the memory card and the card reader.

Although the invention has been shown and described with respect to the preferred embodiments, it will be understood by those skilled in the art that various changes and modifications may be made without departing from the spirit and scope of the invention as defined in the following claims.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A connector for use in a card reader for reading an information from a memory card, the connector comprising:
    a frame having an opening for accommodating insertion of a memory card therein and removal of a memory card therefrom,
    a plurality of connector terminals mounted on said frame, each of said connector terminals having an inner end and a curved portion, each of said connector terminals being electrically insulated from the others of said connector terminals, each of said connector terminals extending away from a portion of said frame at its curved portion so that the connector terminals may contact a memory card,
    a switch for detecting insertion of a memory card into said frame opening, said switch being mounted within said frame, and
    a lever supporting a portion of each of said connector terminals, said lever being actuatable to move at least a portion of each of said connector terminals to facilitate their even contact with a memory card;
    wherein said lever includes a frontal bead and a rear bead, said frontal and rear beads serving to limit upward deflection of said of said curved portion of said connector terminals; and
    wherein said lever further includes a center bead serving to limit upward deformation of said inner ends of said connector terminals.

2. The connector of claim 1, wherein said frame is divided into an upper member and a lower member, said upper member and said lower member forming said opening for receiving a memory card therebetween, and said frame having at least one hook for firmly securing said upper member to said lower member, said hook having an upper slanted surface and a lower slant surfaces adjacent to each other, the lower slanted surface for facilitating assembly of said upper and lower members and for preventing unintended separation of said upper member from said lower member.

3. The connector of claim 2, wherein at least pair of posts and a pair of receiving holes are formed within said frame in order to allow said upper and lower members to be firmly and fixedly assembled with respect to each other, each of said posts extending through each of said receiving holes, and at least one of said posts having been melted and then manipulated in order to cause it to have a diameter larger than that of its corresponding receiving hole in order to prevent removal of said melted post from its corresponding receiving hole, thereby maintaining said upper and lower members of said frame in secure assembled relation with each other.

4. The connector of claim 1, further comprising a push plate for pushing a memory card in a desired direction in order to minimize movement of the memory card in undesired directions while it is being inserted into the frame.

5. The connector of claim 1, wherein each of said connector terminals is provided with an external end, a curved portion, a bent portion, an inclined portion and an inner end, each of which is integrally formed with the other portions of said connector terminal, said curved portion having a convex configuration for contact with a memory card, said inner end being bent at an end of said curved portion in order to extend said inner end inwardly, said inclined portion being outwardly extended from said curved portion at a slant angle of about 7.5° with the horizon, said external end outwardly extending from said inclined portion through said bent portion, and said bent portion having a radius of about 1 mm.

6. The connector of claim 1, wherein said switch includes a movable member elastically deformed when its lead comes into a contact with the memory card and the fixed member elastically contacted to the movable member before the movable member is deformed by the memory card.

7. A connector fur use in a card reader for reading information from a memory card, the connector comprising:
    a frame for accommodating a memory card therein, the frame having an opening through which the card is inserted into the frame and removed from the frame;
    a plurality of connector terminals mounted on the frame, said connector terminals being insulated from one another and said connector terminals being contactable to the card, each of said connector terminals having an inner end and a curved portion, each of said connector terminals extending out of the frame in order to be contactable with a card;
    a switch for detecting complete insertion of a memory card into said frame opening, said switch being mounted in an inner rear portion of the frame;
    a landing yoke supporting one portion of each of said connector terminals, said landing yoke being pivotably mounted with said frame in order to minimize sliding contact area of a memory card with said connector terminals during insertion or removal of memory card in said frame; and
    a lever supporting a portion of at least some of said connector terminals, said lever being actuatable to move at least a portion of each of said connector terminals to facilitate their even contact with a memory card;
    wherein said lever includes a frontal bead and a rear bead, said frontal and rear beads serving to limit upward deflection of said of said curved portion of said connector terminals; and
    wherein said lever further includes a center bead serving to limit upward deformation of said inner ends of said connector terminals.

8. A connector as recited in claim 7, wherein said switch includes a movable member, said movable member being elastically deformable when a lead located on it comes into a contact with a memory card; and wherein said switch includes a fixed member, said fixed member being in elastic contact with said movable member prior to said movable member being deformed by a memory card.

9. A connector as recited in claim 7, wherein said landing yoke is connected to said frame by a hinge, said landing yoke being pivotable within a predetermined angular range about said hinge, and said landing yoke serving to contact a portion of each of said connector terminals to a card by pivotally raising said connector terminals a predetermined distance when a memory card is inserted into said frame.

* * * * *